US012792152B2

(12) United States Patent
Rosato et al.

(10) Patent No.: US 12,792,152 B2
(45) Date of Patent: Nov. 10, 2026

(54) SYSTEM AND METHOD FOR PROVIDING SCALE-RESPONSIVE DYNAMIC HAPTIC FEEDBACK

(71) Applicant: PROVA Innovations Ltd., Hamilton (CA)

(72) Inventors: Matthew Rosato, Hamilton (CA); Neil Thiessen, Princeton (CA); Guha Ganesh, Hamilton (CA)

(73) Assignee: PROVA Innovations Ltd., Hamilton (CA)

( * ) Notice: Subject to any disclaimer, the term of this patent is extended or adjusted under 35 U.S.C. 154(b) by 276 days.

(21) Appl. No.: 18/597,176

(22) Filed: Mar. 6, 2024

(65) Prior Publication Data

US 2025/0284339 A1 Sep. 11, 2025

(51) Int. Cl.
*G06F 3/01* (2006.01)

(52) U.S. Cl.
CPC .................................... *G06F 3/016* (2013.01)

(58) Field of Classification Search
CPC ....................................................... G06F 3/016
See application file for complete search history.

(56) References Cited

U.S. PATENT DOCUMENTS 7,714,701 B2 * 5/2010 Altan ..................... B60Q 9/008 340/407.1
8,362,882 B2 * 1/2013 Heubel ................... G06F 3/011 340/407.1
10,687,582 B2 6/2020 Meschter et al.
11,745,083 B2 9/2023 Reicher et al.
2010/0141407 A1 * 6/2010 Heubel ............... G06F 3/04886 340/407.1
2011/0140870 A1 * 6/2011 Ullrich .................... G06F 3/016 340/407.2
2019/0324545 A1 10/2019 Miyamoto et al.
(Continued)

FOREIGN PATENT DOCUMENTS

| | | | |
|---|---|---|---|
| EP | 2026314 | B1 | 9/2020 |
| WO | 2021180276 | A1 | 9/2021 |
| WO | 2021248849 | A1 | 12/2021 |

OTHER PUBLICATIONS

Extended European Search Report dated Aug. 30, 2024 in European Patent Application No. 24160733.2 (8 pages).

*Primary Examiner* — Daryl C Pope
(74) *Attorney, Agent, or Firm* — SMART & BIGGAR LP; Isis E. Caulder

(57) ABSTRACT

A haptic feedback mechanism for a medium includes: a sensor disposed within the medium having a size; circuitry in communication with the sensor; conductive traces in communication with the circuitry, the traces having properties that alter when the size of the medium changes; and a processor configured to: determine changes in the size of the medium based on a unique pattern of the traces generated by the changes in the size of the medium, and optimize a frequency of a haptic harmonic that generates a standing wave on a haptic actuator proximate to the medium. A method for providing dynamic adjustment of haptic feedback for a medium includes: determining that a size of the medium has changed, thereby generating detected changes; and based on the detected changes, optimizing a frequency of a haptic actuator to produce a standing wave within at least a portion of the medium.

20 Claims, 13 Drawing Sheets

(56) References Cited

U.S. PATENT DOCUMENTS

| | | | |
|---|---|---|---|
| 2020/0386631 A1 | 12/2020 | Wang et al. | |
| 2021/0103335 A1* | 4/2021 | Wang | G06F 3/016 |
| 2022/0291748 A1 | 9/2022 | Harazi et al. | |

* cited by examiner

SYSTEM AND METHOD FOR PROVIDING SCALE-RESPONSIVE DYNAMIC HAPTIC FEEDBACK

FIELD

Various embodiments are described herein that generally relate to system for providing scale-responsive dynamic haptic feedback, as well as the methods.

BACKGROUND

The following paragraphs are provided by way of background to the present disclosure. They are not, however, an admission that anything discussed therein is prior art or part of the knowledge of persons skilled in the art.

Dynamic adjustment of haptic feedback in response to changes in the size or shape of a medium (e.g., article of clothing) may give rise to a number of interconnected problems. These problems can significantly impact the effectiveness and user experience of haptic systems.

One such problem is alteration of a standing wave due to a medium size change. Another problem is a lack of awareness of medium alteration. Another problem is an inability to compensate for medium alterations. Another problem is human error from customer-entered data.

There is a need for a system and method that addresses the challenges and/or shortcomings described above.

SUMMARY OF VARIOUS EMBODIMENTS

Various embodiments of a system and method for providing scale-responsive dynamic haptic feedback, and computer products for use therewith, are provided according to the teachings herein.

According to one aspect of the invention, there is disclosed a haptic feedback mechanism for a medium comprising: a sensor disposed within the medium having a size and shape; circuitry in communication with the sensor; a plurality of traces in communication with the circuitry, the traces having properties that alter when the size or shape of the medium changes; and a processor configured to: determine changes in the size or shape of the medium based on a unique pattern of the traces generated by the changes in the size or shape of the medium; and optimize a frequency of a haptic harmonic that generates a standing wave on a haptic actuator proximate to the medium.

In at least one embodiment, the medium is at least a portion of one of a piece of clothing, a textile, a seat, or a desk surface.

In at least one embodiment, the circuitry is at least one of electrical circuitry or optical circuitry.

In at least one embodiment, the processor is one of an FPGA, an ASIC, a microprocessor, or dedicated logic.

In at least one embodiment, the size is a length or a volume.

In at least one embodiment, the medium is made of a material that supports formation of the standing wave.

In at least one embodiment, the standing wave can be modulated by at least one of a half wavelength or quarter wavelength.

In at least one embodiment, the mechanism further comprises a plurality of cuttable regions connected to the plurality of traces such that each of the traces terminates at corresponding cuttable regions.

In at least one embodiment, the processor is further configured to: detect the unique pattern of the traces generated by the changes in the size or shape of the medium based on the removal of one or more of the cuttable regions.

In at least one embodiment, the mechanism further comprises an environmental sensor that detects at least one of temperature, humidity, or pressure.

In at least one embodiment, the haptic actuator produces sound, ultrasound, or both sound and ultrasound.

According to another aspect of the invention, there is disclosed a method for providing dynamic adjustment of haptic feedback for a medium comprising: determining that a size or shape of the medium has changed, thereby generating detected changes; and based on the detected changes, optimizing a frequency of a haptic actuator to produce a standing wave within at least a portion of the medium.

In at least one embodiment, the optimizing the frequency comprises: determining the frequency based at least in part on properties of the medium and how propagation of the standing wave is affected by the properties.

In at least one embodiment, the method further comprises inputting the detected changes into an AI model that predicts optimal adjustments to the frequency for the haptic actuator.

In at least one embodiment, the optimizing the frequency is based at least in part on updated haptic feedback parameters based on the optimal adjustments predicted by the AI model.

In at least one embodiment, the AI model predicts the optimal adjustments to at least one of the frequency, an amplitude, and a waveform.

In at least one embodiment, the optimizing the frequency is based on haptic feedback parameters extracted from a look-up table associated with size detection.

In at least one embodiment, the method further comprises determining that an environmental factor has changed, the environmental factors comprising at least one of temperature, humidity, or pressure; and the optimizing the frequency of the haptic actuator is also based on a change in the environmental factor.

In at least one embodiment, the haptic actuator produces sound, ultrasound, or both sound and ultrasound.

In at least one embodiment, the method further comprises updating the AI model at least in part by adjusting internal parameters or algorithms based on data obtained related to at least one of a user's response or effectiveness of the predicted optimal adjustments.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
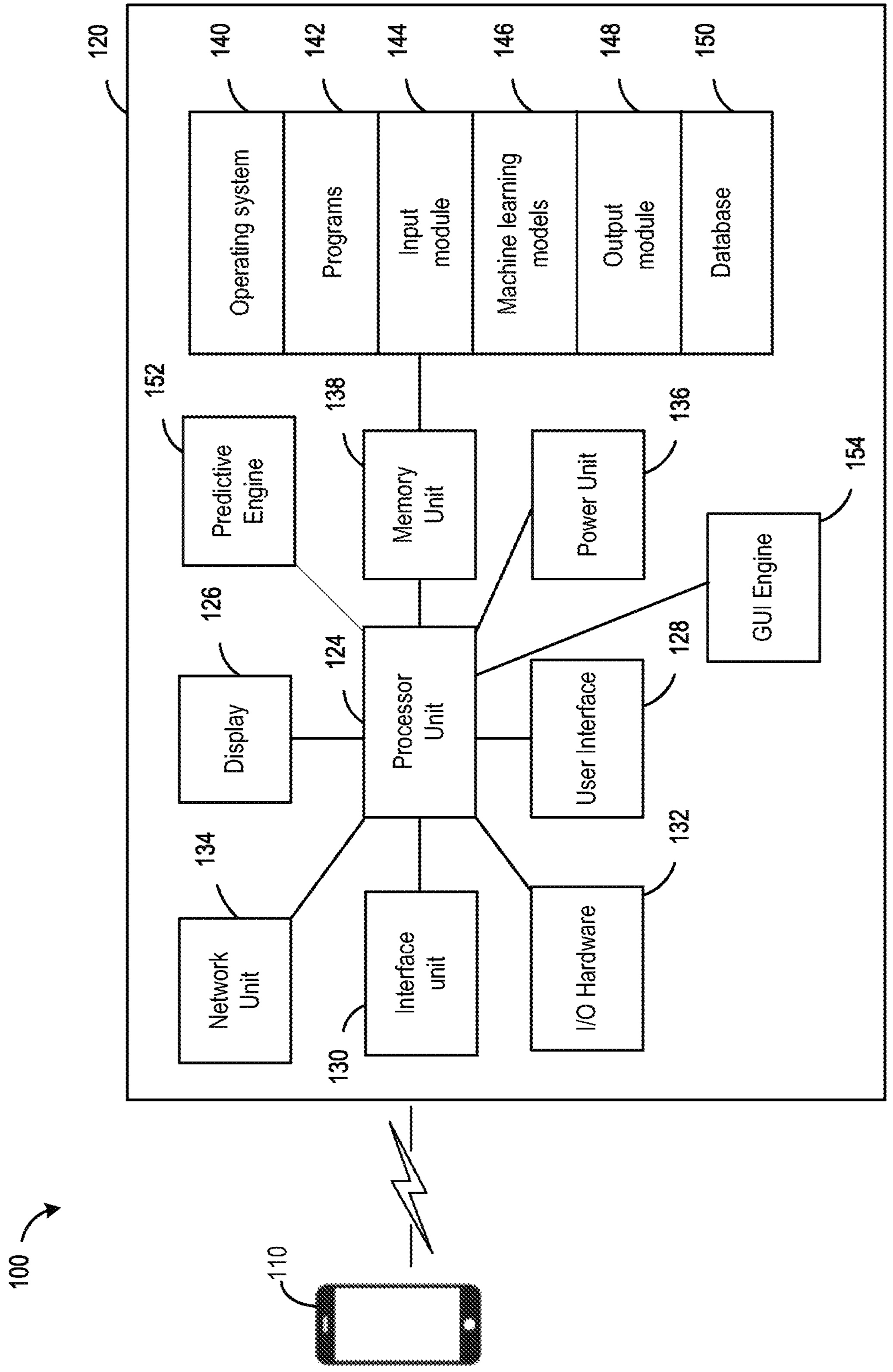
FIG. 1 shows a block diagram of an example embodiment of a system for providing scale-responsive dynamic haptic feedback.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems, or methods having all of the features of any one of the devices, systems, or methods described below or to features common to multiple or all of the devices, systems, or methods described herein. It is possible that there may be a device, system, or method described herein that is not an embodiment of any claimed subject matter. Any subject matter that is described herein that is not claimed in this document may be the subject matter of another protective instrument, for example, a continuing patent application, and the applicants, inventors, or owners do not intend to abandon, disclaim, or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical signal, electrical connection, or a mechanical element depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5%, or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

It should also be noted that the use of the term "window" in conjunction with describing the operation of any system or method described herein is meant to be understood as describing a user interface for performing initialization, configuration, or other user operations.

The example embodiments of the devices, systems, or methods described in accordance with the teachings herein may be implemented as a combination of hardware and software. For example, the embodiments described herein may be implemented, at least in part, by using one or more computer programs, executing on one or more programmable devices comprising at least one processing element and at least one storage element (i.e., at least one volatile memory element and at least one non-volatile memory element). The hardware may comprise input devices including at least one of a touch screen, a keyboard, a mouse, buttons, keys, sliders, and the like, as well as one or more of a display, a printer, and the like depending on the implementation of the hardware.

It should also be noted that there may be some elements that are used to implement at least part of the embodiments described herein that may be implemented via software that is written in a high-level procedural language such as object oriented programming. The program code may be written in C++, C#, JavaScript, Python, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer readable medium such as, but not limited to, a ROM, a magnetic disk, an optical disc, a USB key, and the like that is readable by a device having a processor, an operating system, and the associated hardware and software that is necessary to implement the functionality of at least one of the embodiments described herein. The software program code, when read by the device, configures the device to operate in a new, specific, and predefined manner (e.g., as a specific-purpose computer) in order to perform at least one of the methods described herein.

At least some of the programs associated with the devices, systems, and methods of the embodiments described herein may be capable of being distributed in a computer program product comprising a computer readable medium that bears computer usable instructions, such as program code, for one or more processing units. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

In accordance with the teachings herein, there are provided various embodiments for providing scale-responsive dynamic haptic feedback, and computer products for use therewith.

In at least one embodiment of the invention described herein, one of more of the technical problems associated with the dynamic adjustment of haptic feedback in response to changes in the size or shape of a medium are addressed. These problems can significantly impact the effectiveness and user experience of haptic systems.

Alteration of Standing Wave Due to Medium Size Change: When the size (e.g., length or volume) or shape (e.g., perimeter, boundaries, curvature) of the medium changes, the characteristics of the standing wave generated for haptic feedback are also altered. This is because the properties of standing waves, including their nodes and antinodes (points of minimum and maximum amplitude, respectively), are highly dependent on the dimensions of the medium. A change in size can shift these points, potentially weakening the haptic feedback or making it uneven across the medium. This can degrade the quality of the user experience, making the feedback feel less precise or immersive.

Lack of Awareness of Medium Alteration: Traditional haptic feedback systems are not designed to detect changes in the medium's size or shape in real time. Without this capability, the system cannot adjust the haptic feedback to maintain its effectiveness. This lack of awareness means that the system continues to operate based on the original dimensions of the medium, leading to suboptimal haptic performance and a diminished user experience.

Inability to Compensate for Medium Alterations: Without real-time information on changes to the medium, the system cannot make the necessary adjustments to the haptic feedback. This includes being unable to modify the amplitude or wavelength of the vibrational waves to compensate for the new size or shape of the medium. The inability to adapt to these changes means that the system cannot ensure consistent and effective haptic feedback across the altered medium.

Human Error from Customer Entered Data: In systems that rely on user input to adjust settings, there is always a risk of human error. Users may enter incorrect data regarding the size or shape of the medium, leading to inappropriate adjustments to the haptic feedback. This can result in a poor user experience, with feedback that is either too weak or too strong, or improperly distributed across the medium. Relying on manual input for calibration or adjustment is inherently less reliable and can significantly affect the system's performance and user satisfaction.

Reference is first made to FIG. 1, showing block diagram of an example embodiment of a system 100 for providing scale-responsive dynamic haptic feedback. The system 100 includes at least one user device 110 and at least one server 120. The user device 110 and the server 120 may communicate, for example, wirelessly or over the Internet.

The user device 110 may be a computing device that is operated by a user. The user device 110 may be, for example, a smartphone, a smartwatch, a tablet computer, a laptop, a virtual reality (VR) device, or an augmented reality (AR) device. The user device 110 may also be, for example, a combination of computing devices that operate together, such as a smartphone and a sensor. The user device 110 may also be, for example, a device that is otherwise operated by a user, such as a drone, a robot, or remote-controlled device; in such a case, the user device 110 may be operated, for example, by a user through a personal computing device (such as a smartphone). The user device 110 may be configured to run an application (e.g., a mobile app) that communicates with other parts of the system 100, such as the server 120.

The server 120 may run on a single computer, including a processor unit 124, a display 126, a user interface 128, an interface unit 130, input/output (I/O) hardware 132, a network unit 134, a power unit 136, and a memory unit (also referred to as "data store") 138. In other embodiments, the server 120 may have more or less components but generally function in a similar manner. For example, the server 120 may be implemented using more than one computing device.

The processor unit 124 may include a standard processor, such as the Intel Xeon processor, for example. Alternatively, there may be a plurality of processors that are used by the processor unit 124, and these processors may function in parallel and perform certain functions. The display 126 may be, but not limited to, a computer monitor or an LCD display such as that for a tablet device. The user interface 128 may be an Application Programming Interface (API) or a web-based application that is accessible via the network unit 134. The network unit 134 may be a standard network adapter such as an Ethernet or 802.11x adapter.

The processor unit 124 may execute a predictive engine 152 that functions to provide predictions by using machine learning models 146 stored in the memory unit 138. The predictive engine 152 may build a predictive algorithm through machine learning. The training data may include, for example, image data, video data, audio data, and text.

The processor unit 124 can also execute a graphical user interface (GUI) engine 154 that is used to generate various GUIs. The GUI engine 154 provides data according to a certain layout for each user interface and also receives data input or control inputs from a user. The GUI then uses the inputs from the user to change the data that is shown on the current user interface, or changes the operation of the server 120 which may include showing a different user interface.

The memory unit 138 may store the program instructions for an operating system 140, program code 142 for other applications, an input module 144, a plurality of machine learning models 146, an output module 148, and a database 150. The machine learning models 146 may include, but are not limited to, image recognition and categorization algorithms based on deep learning models and other approaches. The database 150 may be, for example, a local database, an external database, a database on the cloud, multiple databases, or a combination thereof.

In at least one embodiment, the machine learning models 146 include a combination of convolutional and recurrent neural networks. Convolutional neural networks (CNNs) are designed to recognize images, patterns. CNNs perform convolution operations, which, for example, can be used to classify regions of an image, and see the edges of an object recognized in the image regions. Recurrent neural networks (RNNs) can be used to recognize sequences, such as text, speech, and temporal evolution, and therefore RNNs can be applied to a sequence of data to predict what will occur next. Accordingly, a CNN may be used to read what is happening on a given image at a given time, while an RNN can be used to provide an informational message.

The programs 142 comprise program code that, when executed, configures the processor unit 124 to operate in a particular manner to implement various functions and tools for the system 100.

Figure 2:
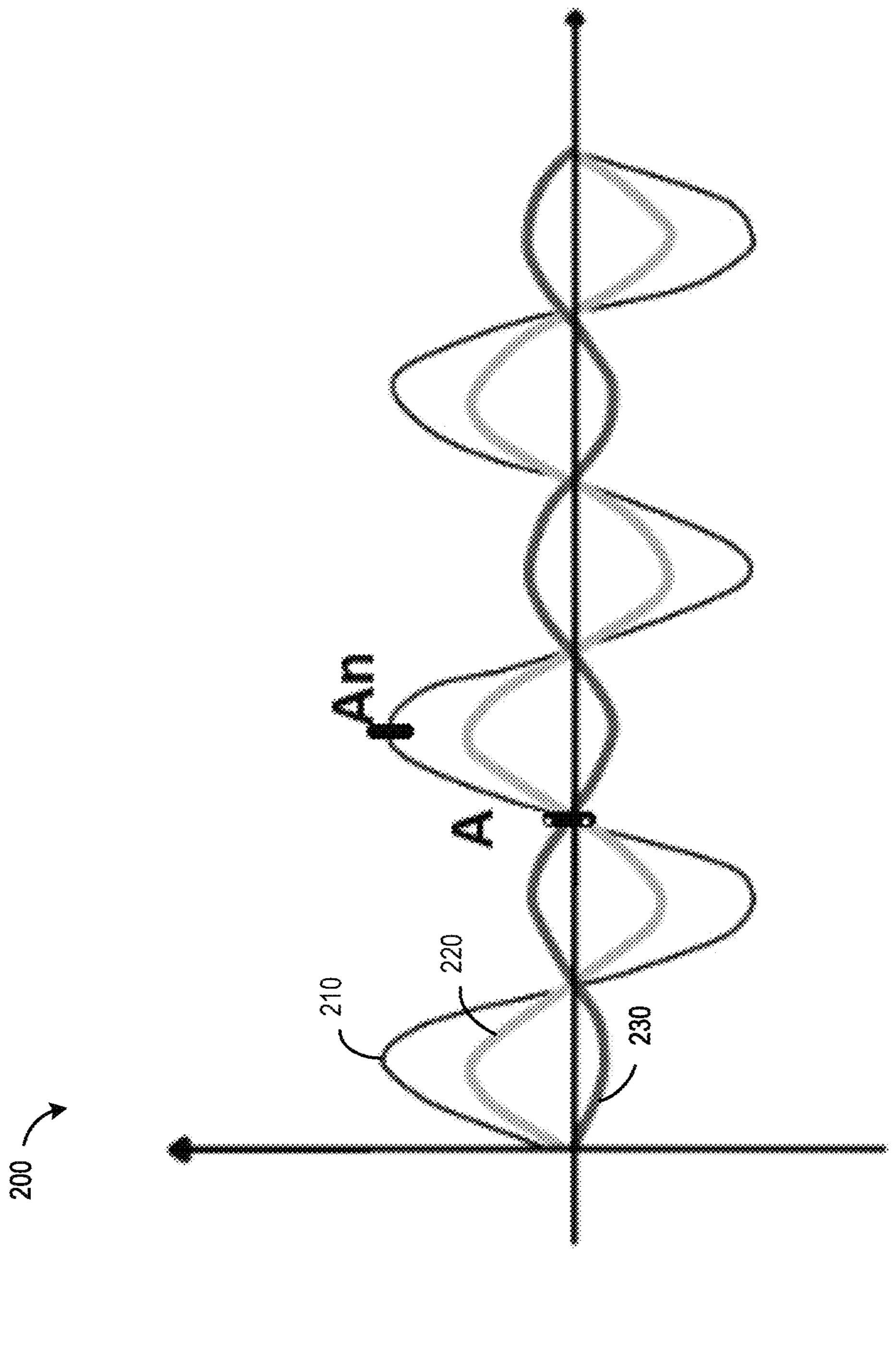
FIG. 2 shows a graph of an example of a waveform of a standing wave with nodes and antinodes.

FIG. 2 shows a graph of an example of a waveform of a standing wave with nodes and antinodes.

A standing wave, also known as a stationary wave, is a wave that remains in a constant position. This phenomenon occurs when two waves of the same frequency and amplitude travel in opposite directions and interfere with each other. The result is a wave that appears to be standing still, hence the name. Standing waves are characterized by nodes and antinodes.

Formation: Standing waves (210) are formed through the interference of two waves traveling in opposite directions (220 and 230). These waves could be sound waves, light, RF, or vibrational. The most common way to observe standing waves is by vibrating a string or a column of air at a specific frequency.

Nodes are points along the medium where there is no movement at all; these points remain stationary. At nodes, the interfering waves cancel each other out through destructive interference (shown as 'A').

Antinodes are points where the medium moves with the greatest amplitude. At these points, the two waves enhance each other through constructive interference (shown as 'An').

Conditions for Formation: For standing waves to form, the waves must have the same frequency and amplitude, and the medium must have fixed boundaries at both ends or be capable of reflecting waves back upon themselves. The length of the medium and the wavelength of the traveling waves must also satisfy certain conditions, typically related to the harmonics of the wave.

A haptic feedback system is designed to detect a change in the medium and dynamically adjust its vibrational output based on real-time changes in the size of the medium it operates upon. The system integrates advanced technologies, including sensors and adaptive circuitry, artificial intelligence (AI), and precise control over vibrational wave properties to deliver an optimized tactile experience. The system's primary objective is to provide maximum stimulation by adjusting the strength and characteristics of haptic feedback according to the medium's current size and shape.

The system may include one of more components, each having specific functionality as applied to a medium (e.g., article, clothing attachment, insole, textile, seat, desk surface etc.).

Sensors and circuitry: These are sensors and circuitry designed with adjustable traces. These traces are capable of detecting changes in the size or shape of the medium. The flexibility of the sensors and circuitry allows it to conform to various surfaces and mediums, making the system versatile across different applications. Embodiments of the circuitry and sensors include flexible printed circuit boards (FPCBs), fibre optics, or conductive textiles.

Detection of medium size alteration: The traces are sensitive to stretching, bending, cutting, or any form of dimensional change. When the medium's size changes, these traces alter their electrical properties (such as resistance), which can be detected by the system.

Microcontroller integration: An FPCB is connected to a microcontroller that serves as the system's brain. Upon receiving signals indicative of a change in the medium's size, the microcontroller processes this information to determine the necessary adjustments to the haptic feedback.

AI-Driven haptic adjustments: The system may employ AI algorithms to analyze the change in medium size and predict the optimal adjustments needed for the haptic feedback. This includes maximizing the amplitude of the standing wave and adjusting the wavelength to produce various phased maximums across the medium, ensuring that the haptic feedback is felt uniformly and intensely across the altered area.

The system may provide dynamic adjustment of haptic feedback in one or more ways.

Amplitude maximization: To achieve maximum stimulation, the system can increase the amplitude of the standing wave generated by the haptic actuators. This ensures that the feedback is strong and noticeable.

Wavelength adjustment: By adjusting the wavelength of the vibrational waves, the system can create phased maximums at different points across the medium. This technique allows for a more nuanced and varied haptic experience, which can be tailored to specific applications or user preferences.

Real-time area/size modification detection: This is the capability to detect and respond to changes in the medium's size in real time. This allows for a responsive and adaptive haptic feedback system that can cater to dynamic environments and applications, such as wearable technology, interactive displays, or medical devices that require precise and adaptable tactile feedback.

Haptic feedback: This refers to the use of touch or vibrations to communicate information or provide sensory feedback to the user. This technology exploits the human body's sensitivity to touch to enhance the user experience in various applications, particularly in devices or systems where visual or auditory feedback might be insufficient, impractical, or overloaded. The application of haptic feedback across a medium that supports the propagation of vibrational waves can be seen in several fields, ranging from consumer electronics to advanced medical training simulators.

At least some of the embodiments described herein address one or more technical problems associated with the dynamic adjustment of haptic feedback. These problems are addressed by, for example, integrating sensors and adaptive circuitry in, on, or near the medium that can detect changes in the medium's size or shape in real time. This information is relayed to a microcontroller, which, with the help of AI algorithms, dynamically adjusts the haptic feedback. By doing so, the system can immediately compensate for any alterations in the medium, ensuring that the standing wave's amplitude and wavelength are optimized for the new dimensions. This eliminates the issues caused by human error in data entry, as the system automatically detects and responds to changes, maintaining an optimal haptic experience without requiring manual adjustments from the user.

A standing wave is formed when two waves of the same frequency and amplitude, but traveling in opposite directions, interfere with each other. The principle of superposition states that the resultant displacement at any point and time is the sum of the displacements of the individual waves. Mathematically, if y1(x,t) and y2(x,t) represent the displacements caused by the two waves at a point x and time t, the resultant displacement y(x,t) can be expressed as:

$$y(x,t)=y1(x,t)+y2(x,t)$$

For waves traveling in opposite directions with equal frequency and amplitude, the equations for y1 and y2 can be represented as:

$$y1(x,t)=A\sin(kx-\omega t)$$

$$y2(x,t)=A\sin(kx+\omega t)$$

where:

A is the amplitude of the waves, k is the wave number (related to the wavelength λ by $k=2\pi/\lambda$), ω is the angular frequency of the waves, x is the position along the medium, t is time.

Adjusting to Changes in Medium Size:

When the size of the medium changes, the boundary conditions for the standing wave also change, affecting the wavelength (λ) and possibly the frequency (ω) that can be supported by the medium. The system recalculates the optimal parameters for the standing wave to maintain effective haptic feedback.

Detecting Size Changes: Sensors and adaptive circuitry detect changes in the medium's size and translates these changes into electrical signals that indicate how the size has altered.

Recalculating Wave Parameters:

The microcontroller receives the size change information and processes this data, such as using AI algorithms, to determine the new optimal wavelength (λ') and amplitude (A') for the standing wave. This involves solving the wave equation under the new boundary conditions imposed by the medium's altered size.

The AI algorithms can predict how the changes in size will affect the distribution of nodes and antinodes across the medium, allowing the system to adjust the wave parameters to ensure that the haptic feedback remains uniform and strong.

Implementing Adjustments:

Based on the recalculated parameters, the system adjusts the input to the haptic actuators to modify the amplitude and frequency of the waves they generate. This ensures that the resultant standing wave matches the new dimensions of the medium, maintaining optimal haptic feedback.

Continuous Feedback Loop: The system continuously monitors for changes in the medium's size, creating a feedback loop that allows for real-time adjustments to the haptic feedback. This ensures that the system can adapt to dynamic changes, providing consistent and effective tactile feedback.

AI Machine learning:

Pattern Recognition: Advanced pattern recognition techniques can be used to understand how different types of alterations (e.g., stretching, compression) affect the haptic feedback. This helps in distinguishing between minor changes that might not require adjustments and significant alterations that do.

Optimizing Wave Parameters: AI can employ predictive models to forecast the optimal standing wave characteristics (amplitude, frequency, wavelength) needed to achieve the best haptic feedback for the new dimensions of the medium. Machine learning models can learn from past adjustments and their outcomes to improve the accuracy of these predictions over time.

Adaptive Learning: The system can use reinforcement learning, a type of machine learning where algorithms learn to make decisions by trying different strategies and learning from the outcomes. This approach allows the system to adaptively learn the best adjustments for a wide range of medium sizes and shapes.

Others incorporate basic vibration motors in haptic feedback mechanisms but lack targeted feedback based on dynamic size adaptation.

Differentiation/Improvements:

Integration of Real-Time Physical and Computational Adaptability: This may improve on a system, which may offer adaptability in terms of feedback intensity or patterns, by integrating physical changes (detected through sensors and adaptive circuitry) with computational adjustments (via AI algorithms) to provide a highly responsive and personalized haptic experience. This dual adaptability may offer an improvement over conventional systems.

Precision in Haptic Feedback: The precision with which this system can target haptic feedback may offer an improvement over conventional systems. By controlling the vibration effects so specifically, the system can create more nuanced and varied tactile sensations, which can be crucial for applications requiring detailed haptic feedback, such as medical simulations or advanced virtual reality experiences.

Technical Benefits:

Real-Time Size Detection and Feedback Adjustment: The capability to detect changes in the medium's size in real time and immediately adjust the haptic feedback provides a technical benefit. This feature may ensure that the system's feedback is always optimized for the current conditions, providing a consistent and high-quality user experience.

AI-Driven Dynamic Personalization: The use of AI to analyze changes and make predictive adjustments to the haptic feedback may represent an advancement in making haptic systems more intelligent and responsive. This allows the system to learn from interactions and improve its performance over time, offering a truly personalized experience.

At least some of the embodiments described herein provide a technical advantage by their integration of features aimed at addressing limitations in existing haptic feedback systems. One example is the use of a flexible printed circuit board equipped with adjustable conductive traces for real-time size detection of the haptic medium. This enables personalized adjustments to feedback based on the medium's size and shape. Another example is the inclusion of a specialized haptic medium to control vibration effects and direct them to specific regions. Compared to conventional systems, which may offer adjustability or simple haptic feedback, these embodiments may provide dynamic personalization and precise stimulation capabilities. This may result from a dynamic haptic feedback system based on size detection and the use of a haptic medium for targeted stimulation.

At least some of the embodiments described herein incorporate a personalized feedback mechanism that dynamically adjusts haptic feedback based on real-time size data, addressing limitations in conventional devices, which often rely on standardized feedback systems. This may enhance efficacy by leveraging precise stimulation through the haptic medium.

At least some of the embodiments described herein exhibit versatility by dynamically tailoring feedback to individual user parameters, ensuring effective accommodation across various sizes and shapes, and addressing shortcomings present in existing solutions with rigid feedback systems.

At least some of the embodiments described herein include the ability to dynamically adjust feedback, which not only enhances the precision of the haptic sensations but also significantly improves the overall user experience. By ensuring that the feedback is always optimized for the current conditions, users receive more meaningful and satisfying tactile responses, which can be crucial in applications ranging from virtual reality to wearable devices.

Reduced Dependency on User Input:

Conventional systems may require users to manually adjust settings to change the intensity or type of haptic feedback based on their preferences or changes in the usage context. The embodiments described herein may minimize or eliminate the need for such manual adjustments by automatically adapting to changes, thereby reducing the potential for human error and enhancing the system's ease of use.

Increased Application Potential:

The precise and adaptable nature of the haptic feedback enabled by the embodiments described herein may open up new application areas for haptic technology. For example, in medical training simulations, the ability to accurately simulate the feel of different tissues or resistance levels without manual recalibration can provide more effective training tools. Similarly, in gaming and entertainment, the enhanced realism and immersion can significantly improve user engagement.

Energy Efficiency:

By optimizing the haptic feedback to the current conditions, the system can potentially operate with greater energy efficiency. Instead of applying a one-size-fits-all approach that may use more power to ensure that feedback is felt under varying conditions, the system may adjust its output to use only the necessary amount of energy to achieve the desired tactile response.

Figure 3:
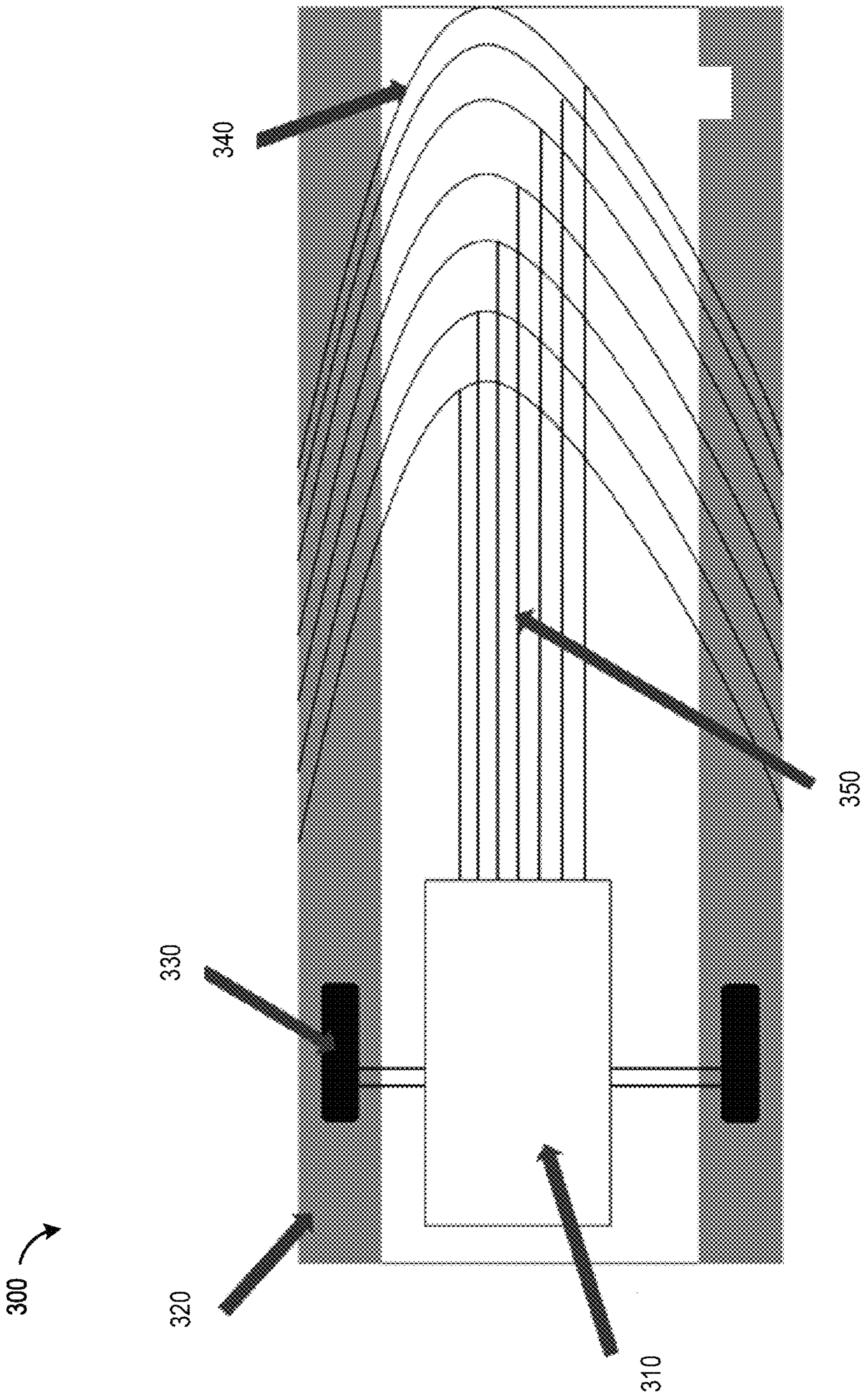
FIG. 3 shows a first schematic diagram of an example embodiment of a haptic medium and conductive traces for medium size detection.

FIG. 3 shows a first schematic diagram of an example embodiment of a system 300 for providing haptic feedback. The system 300 uses a flexible PCB to provide an electrical loop for each standard size. When the insole is cut to a custom size, some of the electrical loop(s) are interrupted, allowing a microprocessor 310 to determine the user size. The microprocessor 310 uses the custom size information to allocate which sensor corresponds to the users' foot location. Based on the size detected, the microprocessor also adjusts the frequency of the haptic feedback to ensure that a standing wave is maintained on the haptic medium. The microprocessor 310 may be a microcontroller (MCU), e.g., in the form of an FPGA, ASIC, dedicated logic (or "digital logic"), or comparator/determination unit. FIG. 3 shows a haptic medium 320 with two haptic vibration motors 330 (although there may be more or fewer). The microprocessor 310 is in communication (e.g., electrical, optical, mechanical, acoustic) with the haptic vibration motors 330 (which may also be referred to as a haptic actuator 330). Conductive traces 350 (e.g., seven, although there may be more or fewer) for size detection are connected to the microcontroller 310. Cuttable regions 340 are connected to the conductive traces 350 (e.g., one cuttable region per conductive trace). The cuttable regions 340 may be connected to conductive traces 350 such that each of the conductive traces 350 terminates at corresponding cuttable regions 340.

The system 300 may include one or more environmental sensors. The environmental sensors may include, for example, humidity sensors. temperature sensors, or pressure sensors. The environmental sensors may be, for example, integrated within the microprocessor 310, located within the haptic medium 320, external but near (e.g., proximate to) the haptic medium 320, or external and distant from (e.g., distal to) the haptic medium 320. Alternatively, or in addition, the environmental sensors may be in the same room as the system 300 to detect one or more of the various environmental conditions of the room that the system 300 is in. The environmental sensors may identify environmental changes, such as temperature or humidity changes, which may affect the size or shape of the medium, and, consequently, the haptic feedback. The environmental sensors may detect and respond to environmental factors that may affect the electrical properties of the medium. This may include adding materials that have been tested to be effective in environmental sensing.

In at least some embodiments, the system 300 makes use of fiber optic cables, conductive textiles, or another medium upon which a signal can be encoded into an electrical response by the microcontroller.

In at least some embodiments, the system 300 may have a sound generating device or ultrasonic generating device in addition to the haptic vibration motors 330. Such a sound/ultrasound device may replace or supplement the haptic vibration motors 330. The sound/ultrasound device may generate, for example, acoustic waves at a particular frequency (or range of frequencies) to create sound effects or to push the air to be felt by a part of the user's body. Where the haptic vibration motors 330 are replaced by a sound/ultrasound device, then the system 300 may be considered to have a sound/ultrasound device 330 in place of the haptic vibration motors 330 as shown in FIG. 3. Alternatively, the system 300 may be considered to have a haptic actuator 330 to represent more broadly any device that provides haptic feedback that are one or more of mechanical, electrical, or acoustic.

Figure 4:
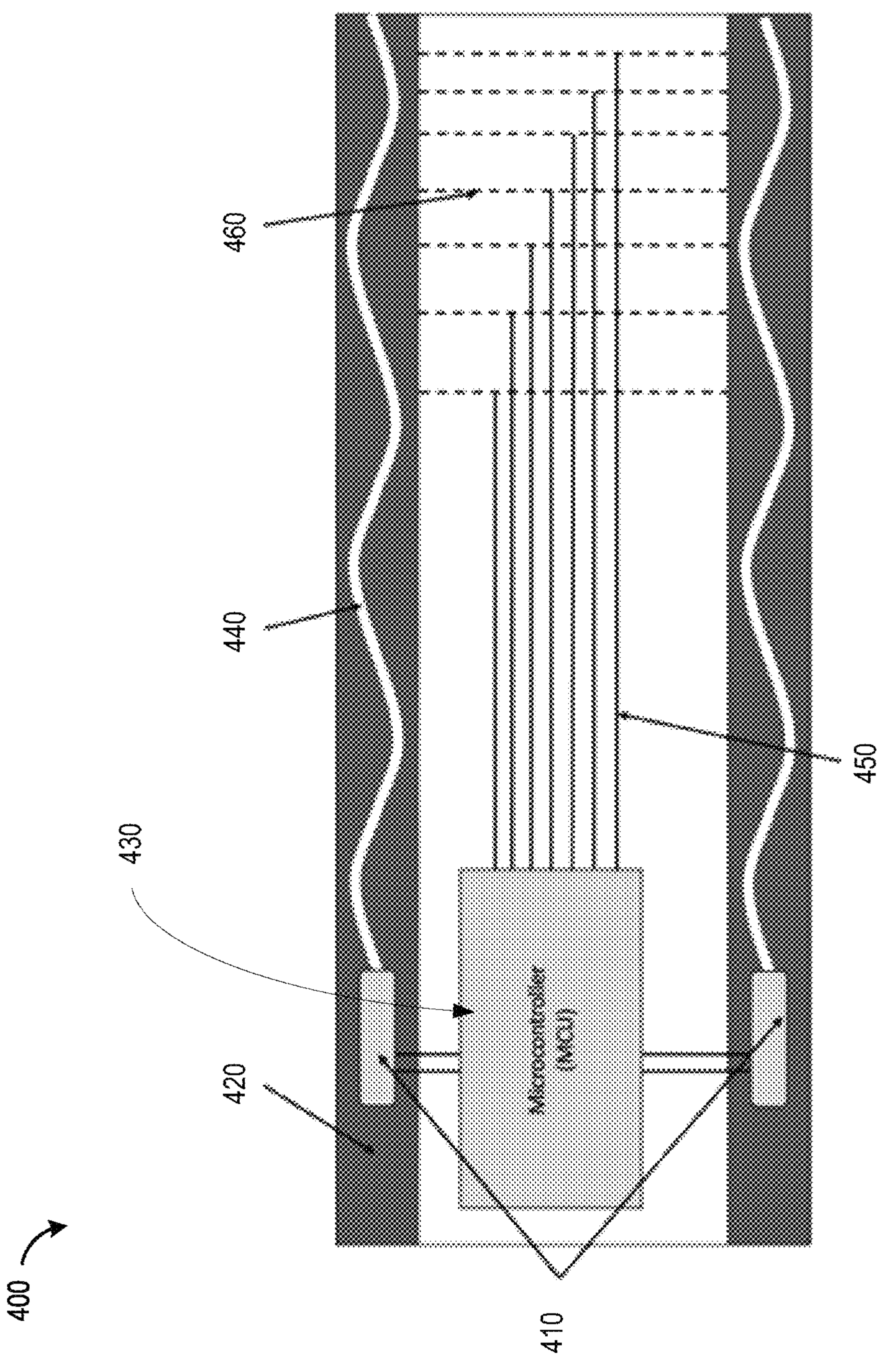
FIG. 4 shows a second schematic diagram of an example embodiment of a haptic medium and conductive traces for medium size detection.

FIG. 4 shows a second schematic diagram of a system 400 for providing haptic feedback. FIG. 4 shows a haptic medium 420 with two haptic actuators 410 (although there may be more or fewer). A microprocessor 430 is in communication (e.g., electrical, optical, mechanical, acoustic) with the haptic actuators 430, which generate haptic feedback signals 440. Conductive traces 450 (e.g., seven, although there may be more or fewer) for size detection are connected to the microcontroller 410. Cuttable regions 460 are connected to the conductive traces 450 (e.g., one cuttable region per conductive trace).

Figure 5:
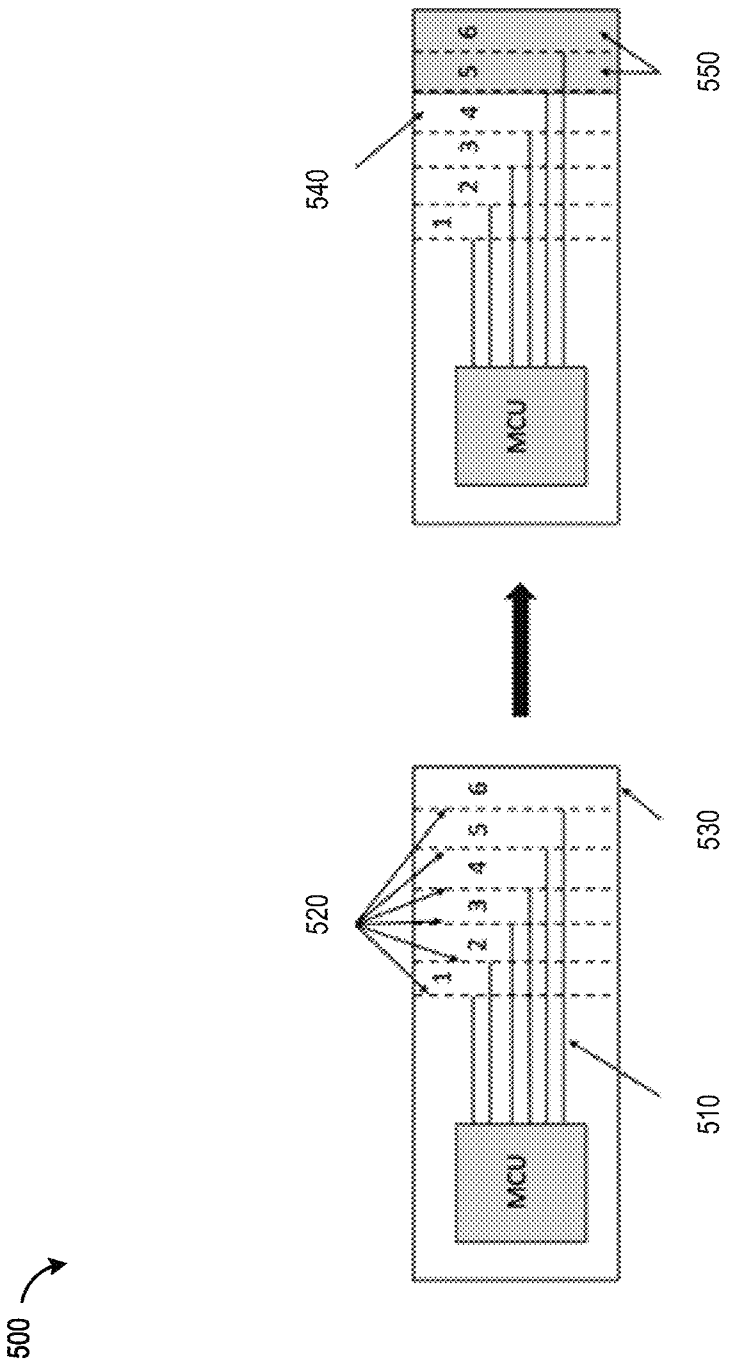
FIG. 5 shows a schematic diagram of adaptive sensors and circuitry.

FIG. 5 shows a schematic diagram of adaptive sensors and circuitry 500 for providing haptic feedback. Conductive traces 510 are connected to cuttable regions 520, with a detected region 530 at the far end. In use, the adaptive sensors and circuitry 500 detect changes, shown here as a detected region 540 and undetected/removed regions 550. This highlights the how changes in the medium's size or shape affect the electrical properties that the sensors detect.

In at least one embodiment, a haptic feedback mechanism for a medium comprises: a sensor disposed within the medium having a size and shape; circuitry in communication with the sensor; a plurality of traces in communication with the circuitry, the traces having properties that alter when the size or shape of the medium changes; and a processor configured to: determine changes in the size or shape of the medium based on a unique pattern of the traces generated by the changes in the size or shape of the medium; and optimize a frequency of a haptic harmonic that generates a standing wave on a haptic actuator proximate to the medium. The mechanism may comprise a plurality of cuttable regions connected to the plurality of traces such that each of the traces terminates at corresponding cuttable regions. The processor may be further configured to detect the unique pattern of the traces generated by the changes in the size or shape of the medium based on the removal of one or more of the cuttable regions.

Figure 6:
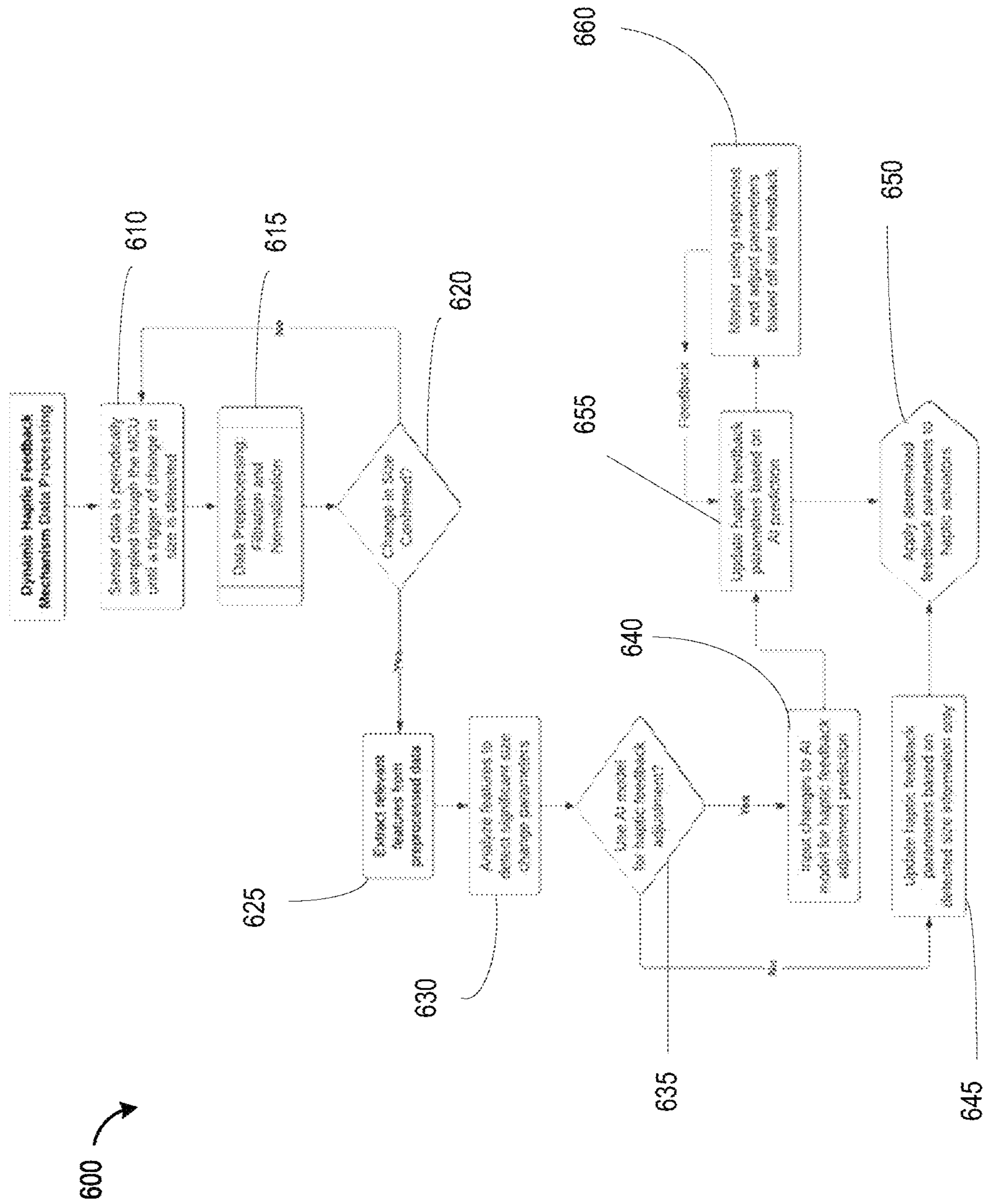
FIG. 6 shows a flow chart of an example embodiment of a data processing flow for a dynamic feedback mechanism.

FIG. 6 shows a flow chart of an example embodiment of a data processing flow 600 for a dynamic feedback mechanism. At a high level, the data processing flow 600 includes data collection (sensor input) through data preprocessing, feature extraction, and change detection. This illustrates how the system processes the information it gathers from the medium. The system may include some or all of the system 100, the system 300, and/or the system 400.

Data Flow Overview:

1. Start:
   a. The process begins when the system is activated or when a change in the medium's size is detected.
2. Data Collection:
   a. Sensor Input: Collect data from the flexible printed circuit board (FPCB) sensors regarding changes in the medium's size or shape.
   b. User Interaction Data: Collect data on how the user interacts with the medium, if applicable.
3. Data Preprocessing:
   a. Filter Noise: Apply filters to remove noise from the sensor data.
   b. Normalize Data: Normalize the data to ensure consistency in measurement scales.
4. Feature Extraction:
   a. Extract relevant features from the preprocessed data that are indicative of the medium's size change or user interaction patterns.
5. Change Detection:
   a. Analyze the extracted features to detect significant changes in the medium's size or shape that require adjustment of the haptic feedback.
6. Decision Making:
   a. AI Model Prediction: Input the detected changes into the AI model. The model predicts the optimal adjustments needed for the haptic feedback parameters (e.g., amplitude, frequency, waveform) based on the current size and shape of the medium.
   b. Learning Component: The AI model uses historical data and feedback loops to improve its predictions over time.
7. Adjust Haptic Feedback:
   a. Based on the AI model's predictions, adjust the haptic feedback parameters dynamically to match the new conditions.
8. Feedback Loop:
   a. Monitor User Response: Monitor the user's response to the adjusted haptic feedback to gather data on its effectiveness.
   b. Adjust Model: Use the response data to further refine and adjust the AI model's predictions, enhancing personalization and accuracy.
9. End:
   a. The process loops continuously, adjusting the haptic feedback in real-time as changes are detected or until the system is deactivated.

It should be appreciated that one or more of the above steps may be optional, for example, to simply the data flow.

At 610, sensor data is periodically sampled through the MCU until a trigger of change in size is detected. The sensor data may include data, for example, from electrical, mechanical, or environmental sensors. The environmental sensors respond to environmental factors, allowing the system to differentiate between changes in the size or shape of the medium due to environmental factors like temperature or humidity as compared to intended user interaction.

At 615, data preprocessing includes filtration and normalization.

At 620, a determination is made whether there is a change in size.

At 625, relevant features are extracted from preprocessed data.

At 630, features are analyzed to detect significant size change parameters.

At 635, a determination is made whether to use an AI model for haptic feedback adjustment. If the determination is positive (i.e., Yes), proceed to 640. If the determination is not positive (i.e., No), proceed to 645.

At 640, changes are input to the AI model for haptic feedback adjustment prediction.

At 645, haptic feedback parameters are updated based on detected size information only.

At 650, determined feedback parameters are applied to haptic actuators.

At 655, haptic feedback parameters are updated based on AI prediction.

At 660, feedback is monitored using responses and parameters are adjusted based off user feedback.

Figure 7:
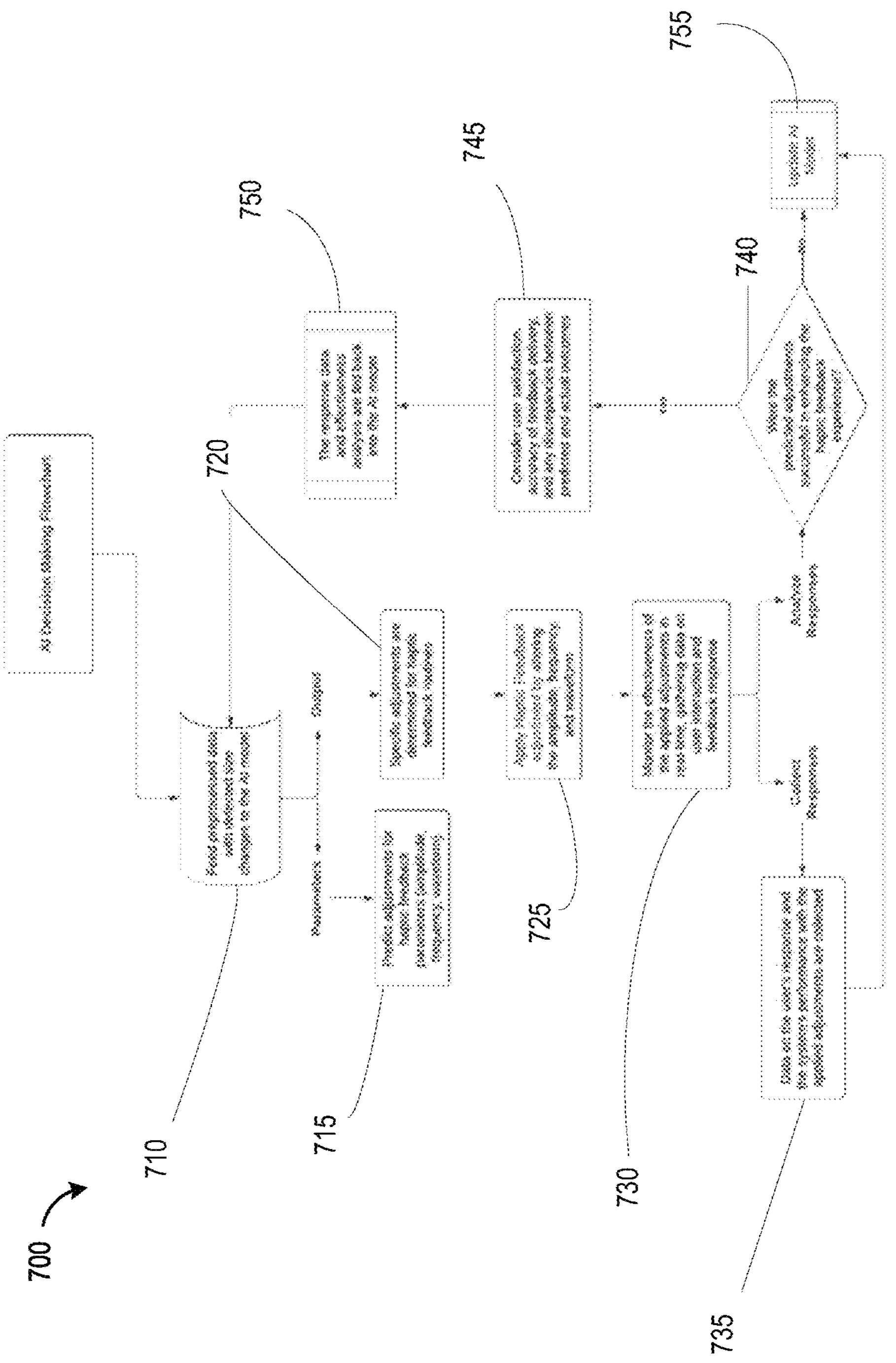
FIG. 7 shows a flow chart of an example embodiment of AI model prediction and learning component flow.

FIG. 7 shows a flow chart of an example embodiment of AI model prediction and learning component flow 700. This includes the decision-making process, including input of detected changes, AI model prediction of optimal haptic feedback adjustments, application of these adjustments, and the feedback loop for continuous learning and improvement. This illustrates an AI-driven dynamic adjustment mechanism. The system may include some or all of the system 100, the system 300, and/or the system 400.

AI Model Components: The AI model at the heart of this process may be a machine learning model, a deep learning neural network, or a reinforcement learning model, depending on the complexity of the task and the specificity of the feedback required.

AI Model Predication and Learning: The AI model's predictive capabilities may be based on environmental changes. This may involve training the AI model with data that includes environmental variables, enabling the system to distinguish between adjustments needed due to changes in the medium and those required due to environmental conditions.

Iterative Learning: The model's learning component may be beneficial for adapting to new patterns in user interaction and changes in medium size, ensuring that the system's performance improves over time.

AI Decision-Making Flow:

1. Input Detected Changes:
   a. The preprocessed and feature-extracted data indicating changes in the medium's size or shape are input into the AI model.
2. AI Model Prediction:
   a. Parameter Prediction: The AI model processes the input data to predict the necessary adjustments to the haptic feedback parameters. This includes determining the optimal amplitude, frequency, and waveform of the haptic signals to adapt to the new conditions of the medium.

b. Output Prediction: The model outputs specific adjustments needed for each haptic feedback parameter.

3. Apply Predicted Adjustments:
   a. The system applies the adjustments to the haptic feedback mechanism, altering the amplitude, frequency, and waveform according to the AI model's predictions.
4. Monitor Feedback Effectiveness:
   a. The system monitors the effectiveness of the applied adjustments in real time, gathering data on user interaction and feedback response.
5. Feedback Loop for Learning:
   a. Collect Response Data: Data on the user's response and the system's performance with the applied adjustments are collected.
   b. Analyze Effectiveness: This data is analyzed to determine the effectiveness of the adjustments. One metric is whether the predicted adjustments were successful in enhancing the haptic feedback experience. This analysis considers user satisfaction, accuracy of feedback delivery, and/or any discrepancies between predicted and actual outcomes.
6. Update AI Model (Learning Component):
   a. Incorporate Feedback Data: The response data and effectiveness analysis are fed back into the AI model.
   b. Model Adjustment: The AI model adjusts its internal parameters or algorithms based on this new data. This may involve retraining the model with the new data set, adjusting weights in a neural network, or updating decision-making rules in more traditional machine learning models.
   c. Continuous Improvement: Over time, this feedback loop enables the AI model to learn from the outcomes of its predictions, improving its accuracy and effectiveness in predicting optimal haptic feedback adjustments.
7. Iterate:
   a. The process iterates, with the AI model continuously refining its predictions based on new data and outcomes, leading to progressively more accurate and effective haptic feedback adjustments.

It should be appreciated that one or more of the above steps may be optional, for example, to simplify the AI decision-making flow.

At 710, the system feeds preprocessed data with detected size changes to an AI model.

At 715 (parameters branch), the system predicts adjustments for haptic feedback parameters e.g., amplitude, frequency, waveform).

At 720 (output branch), the system determines specific adjustments for haptic feedback routines.

At 725, the system applies haptic feedback adjustment by altering the amplitude, frequency, and/or waveform.

At 730, the system monitors the effectiveness of the applied adjustments in real time, gathering data on user interaction and feedback response.

At 735 (collect responses branch), the system collects data on the user's response and the system's performance with the applied adjustments.

At 740 (analyze responses branch), the system determines whether the predicted adjustments were successful in enhancing the haptic feedback experience. If the determination is positive (i.e., Yes), proceed to 745. If the determination is not positive (i.e., No), proceed to 755.

At 745, the system considers user satisfaction, accuracy of feedback delivery, and/or any discrepancies between predicted and actual outcomes.

At 750, the system feeds back the response data and effectiveness analysis into the AI model.

At 755, the system updates the AI model.

Figure 8:
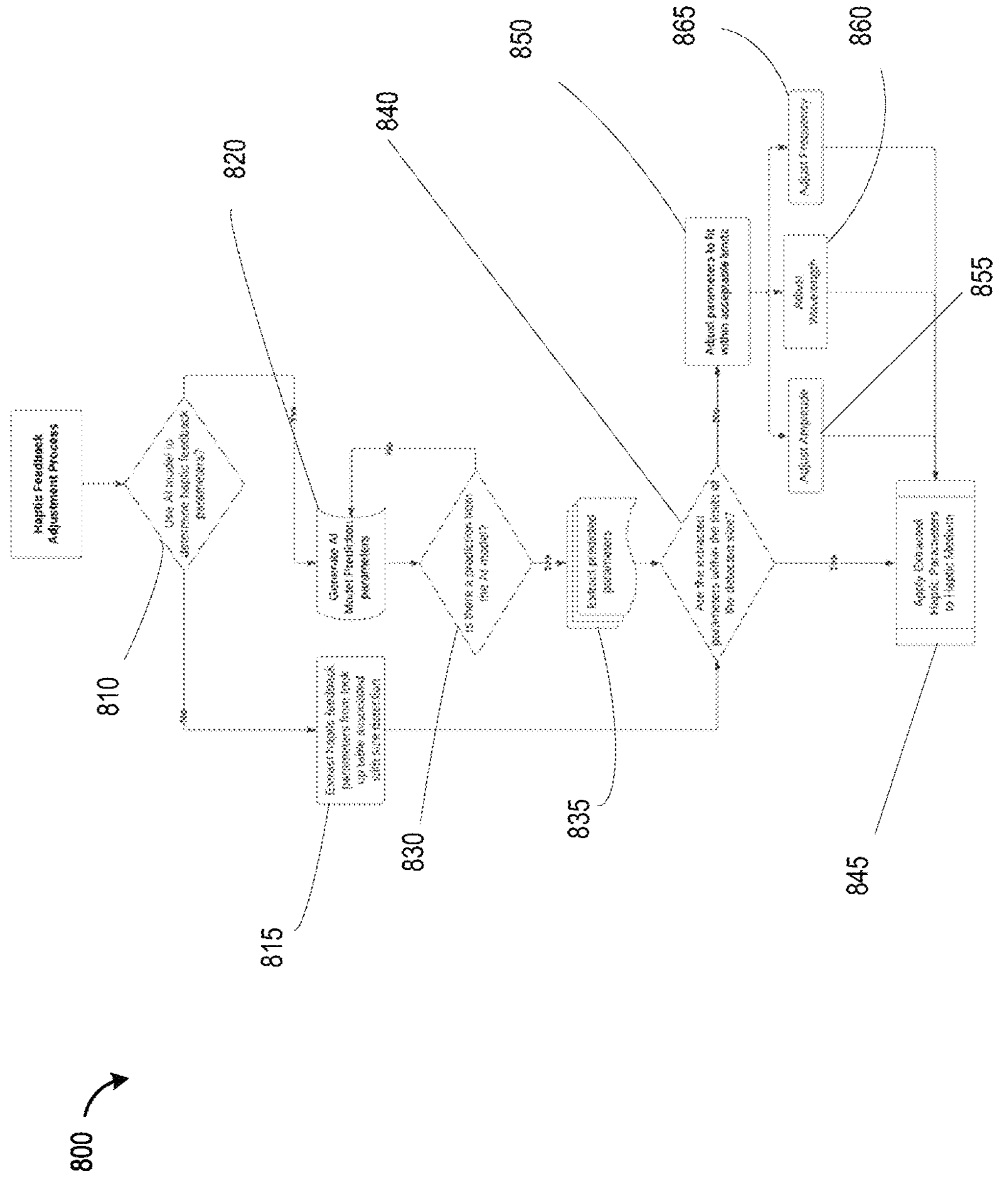
FIG. 8 shows a flow chart of an example embodiment of a haptic feedback adjustment process.

FIG. 8 shows a flow chart of an example embodiment of a haptic feedback adjustment process 800. The system may include some or all of the system 100, the system 300, and/or the system 400. In this process 800, the system adjusts the haptic feedback based on the AI model's predictions. This may include the changes in amplitude, frequency, and waveform of the haptic signals, and how these adjustments are implemented by the actuators.

At 810, the system determines whether to use an AI model to determine haptic feedback parameters. If the determination is positive (i.e., Yes), proceed to 820. If the determination is not positive (i.e., No), proceed to 815.

At 815, the system extracts haptic feedback parameters from a look-up table associated with size detection.

At 820, the system generates AI model prediction parameters.

At 830, the system determines whether there is a prediction from the AI model. If the determination is positive (i.e., Yes), proceed to 835. If the determination is not positive (i.e., No), return to 820.

At 835, the system extracts predicted parameters.

At 840, the system determines whether the extracted parameters are within the limits of the detected size. If the determination is positive (i.e., Yes), proceed to 845. If the determination is not positive (i.e., No), proceed to 850.

At 845, the system applies the extracted haptic parameters to the haptic medium.

At 850, the system adjusts the parameters to fit within acceptable limits. If environmental sensors are used, the system may account for environmental factors (or changes thereto) when adjusting the parameters.

At 855, the system adjusts amplitude. At 860, the system adjusts wavelength. At 865, the system adjusts frequency.

It should be appreciated that one or more of the above steps may be optional, for example, to simply the adjustment process.

In at least one embodiment, a method for providing dynamic adjustment of haptic feedback for a medium comprises: determining that a size or shape of the medium has changed, thereby generating detected changes; and based on the detected changes, optimizing a frequency of a haptic actuator to produce a standing wave within at least a portion of the medium. The optimizing the frequency may comprise determining the frequency based at least in part on properties of the medium and how propagation of the standing wave is affected by the properties. The method of claim 10 may further comprise inputting the detected changes into an AI model that predicts optimal adjustments to the frequency for the haptic actuator. The optimizing the frequency may be based at least in part on updated haptic feedback parameters based on the optimal adjustments predicted by the AI model. The AI model may predict the optimal adjustments to the frequency, an amplitude, and a waveform. The optimizing the frequency may be based on haptic feedback parameters extracted from a look-up table associated with size detection.

Figure 9:
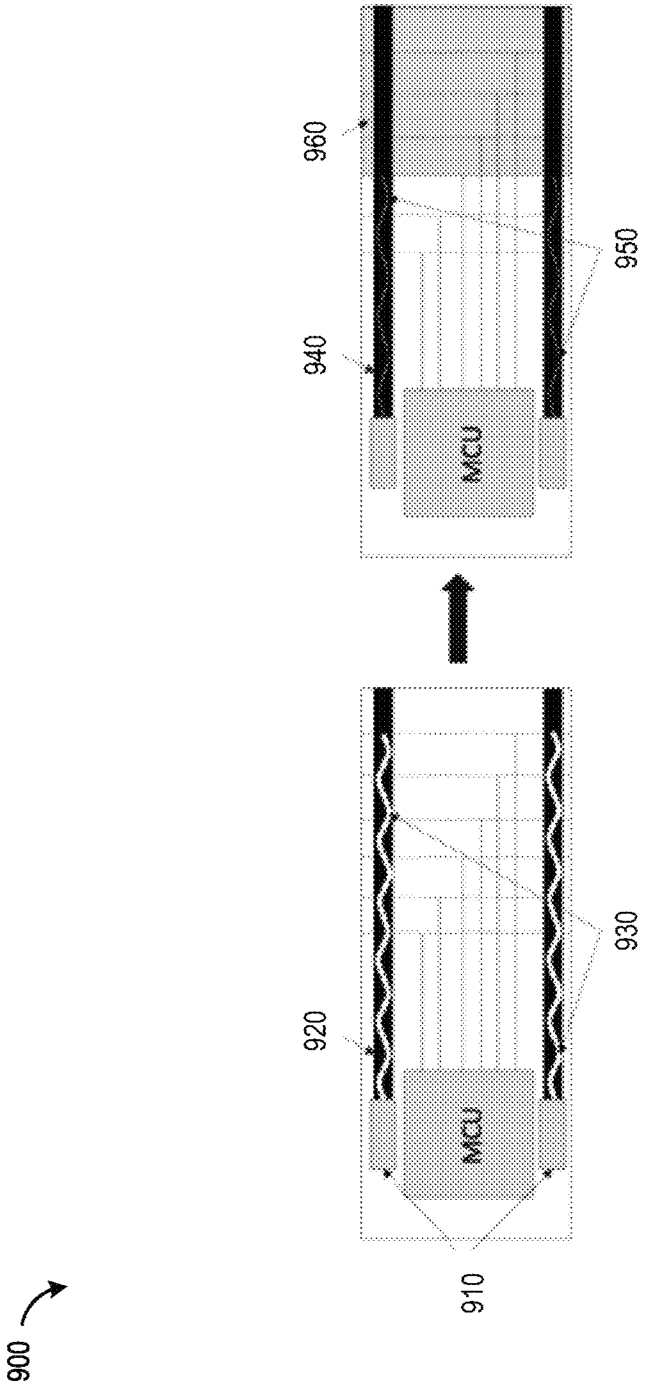
FIG. 9 shows a schematic diagram of material and vibration isolation.

FIG. 9 shows a schematic diagram of material and vibration isolation 900. Haptic actuators 910 produce modulate haptic feedback signals 930 along an isolated haptic medium. After regions are removed, the modulated haptic feedback signals 950 along the isolated haptic medium 940 change due to the removed regions 960. The standing wave may be modulated, for example, by a half wavelength or quarter wavelength.

Additional/Alternative Features

Alternative Sensing Technologies:

In at least some of the embodiments described herein, other forms of sensing technology may detect changes in the medium or user interaction without relying on the specific sensors and adaptive circuitry technology described. For example, optical sensors, capacitive touch sensors, or acoustic sensors may provide alternative means of detecting changes in the medium's size or shape.

Different Computational Approaches:

In at least some of the embodiments described herein, instead of using AI for dynamic adjustment, they may employ simpler algorithmic approaches that adjust feedback based on predefined rules or thresholds. While potentially less sophisticated, this may still offer some level of adaptability without employing AI-driven prediction models.

Varied Haptic Actuation Methods:

In at least some of the embodiments described herein, alternative actuation methods for generating haptic feedback may be employed. For instance, using electroactive polymers or piezoelectric materials as actuators may offer different ways to achieve dynamic feedback. Also, for instance, using sound or ultrasound may offer different ways to achieve dynamic feedback.

Software Enhancements Over Hardware Innovations:

In at least some of the embodiments described herein, the system may employ software solutions that can enhance the user experience of existing haptic hardware. This may involve developing advanced software interfaces that interpret user input in more sophisticated ways to adjust standard haptic feedback hardware.

Modular Systems:

In at least some of the embodiments described herein, modular haptic systems may allow for customization and adjustment by the user or manufacturer to provide a way to achieve dynamic feedback. These may involve interchangeable parts or settings that adjust the feedback intensity, pattern, or location.

Variations:

In at least some of the embodiments described herein, the system may include variations in the materials used for the FPCB, different configurations of the AI model to suit various applications (e.g., medical vs. gaming), or incorporating additional sensors for more comprehensive data collection.

The system may involve the use of a computer primarily for processing and analyzing data collected from sensors embedded within the medium. Some technical obstacles that had to be overcome include developing algorithms for real-time data processing and optimizing the medium's cuttable regions with conductive regions and identifying materials that can isolate vibration patterns significantly while still remaining alterable.

Improvements to Computer Operation:

Increased Efficiency in Data Processing:

The system may improve the efficiency of data processing by utilizing optimized algorithms for real-time analysis. This can reduce the computational load on the system, making it faster and more responsive, especially in applications requiring immediate feedback based on sensor inputs.

Power Efficiency:

By implementing algorithms that dynamically adjust the haptic feedback intensity and pattern based on real-time data, the system can potentially reduce energy consumption. This is because the feedback can be limited to what is necessary for the current situation, avoiding unnecessary power use.

Memory Efficiency:

The use of advanced data compression and efficient data handling techniques can minimize the memory footprint of the system. This may be important when dealing with continuous streams of sensor data, where efficient memory use is important for long-term operation.

Adapting to Environmental Factors:

The system's data processing and power efficiency improvements may be further enhanced by the presence and use of environmental sensors, to take account for environmental adaptability. Software optimizations that enable the system to respond dynamically to environmental change may make adjustments to the system faster or more accurate.

Figure 10:
FIG. 10 shows a diagram of an example of progress of wave propagation.

FIG. 10 shows a diagram of an example of progress of wave propagation 1000. A standing wave is the combination of two waves that are moving in opposite directions. Standing waves are typically formed in situations where a wave is bouncing back and forth in an environment that produces constructive interference. A standing wave occurs when the length of the wave matches the length of the environment. For example, consider a device that sends a single pulse 1010 (0.5 of a wave) down a rope that is fixed at the end. The pulse travels 1020 down the rope ('A' and 'B'). The pulse encounters 1030 the fixed end ('C'). The pulse is reflected 1040 off the end ('D') and returns 1050 on the opposite side of the rope ('E'). When it returns to where it started, it is reflected again, and it continues until it runs out of energy.

Figure 11:
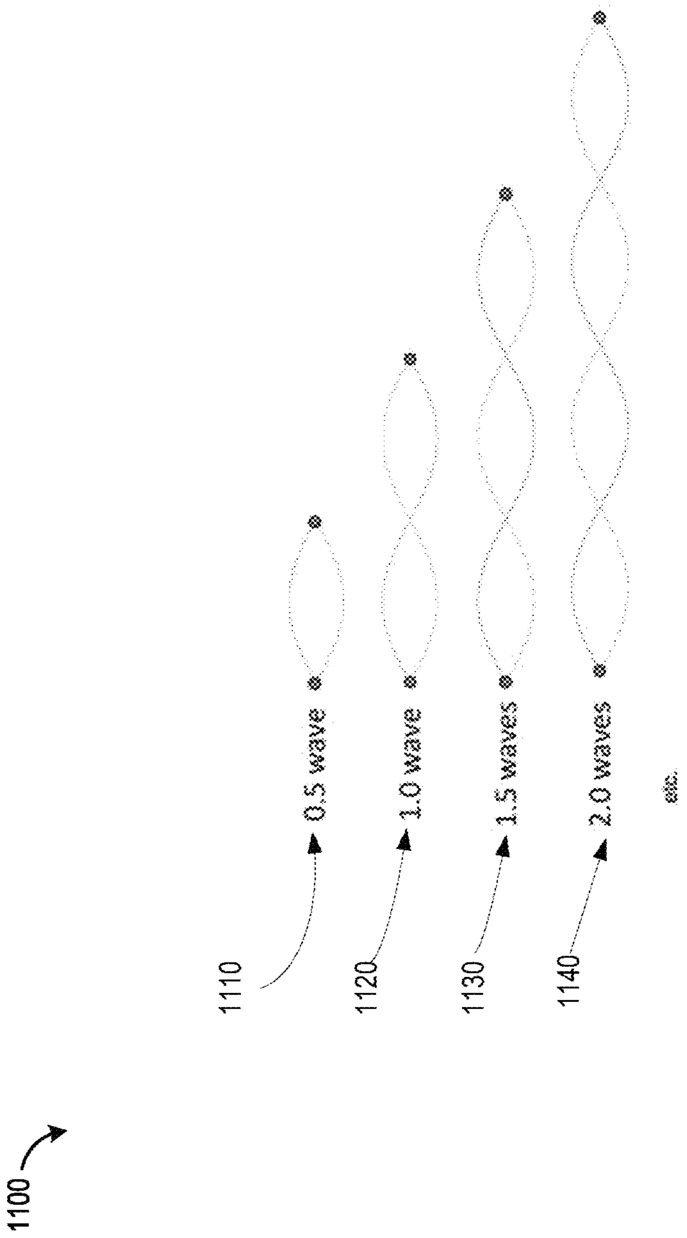
FIG. 11 shows a diagram of an example of standing waves.

FIG. 11 shows a diagram of an example of standing waves 1100. When both ends of the wave are fixed (not free to move back and forth), a standing wave can occur when the medium (rope in this case) is exactly 0.5, 1.0, 1.5, 2.0, 2.5 etc. the length of the wave. Standing wave 1110 has 0.5 length of the wave. Standing wave 1120 has 1.0 length of the wave. Standing wave 1130 has 1.5 length of the wave. Standing wave 1140 has 2.0 length of the wave. Waves are also reflected when the ends are not fixed. Standing waves may occur when one end is fixed and the other free. This occurs when the medium is exactly 0.25, 0.75, 1.25, 1.75 etc. the length of the wave.

Figure 12:
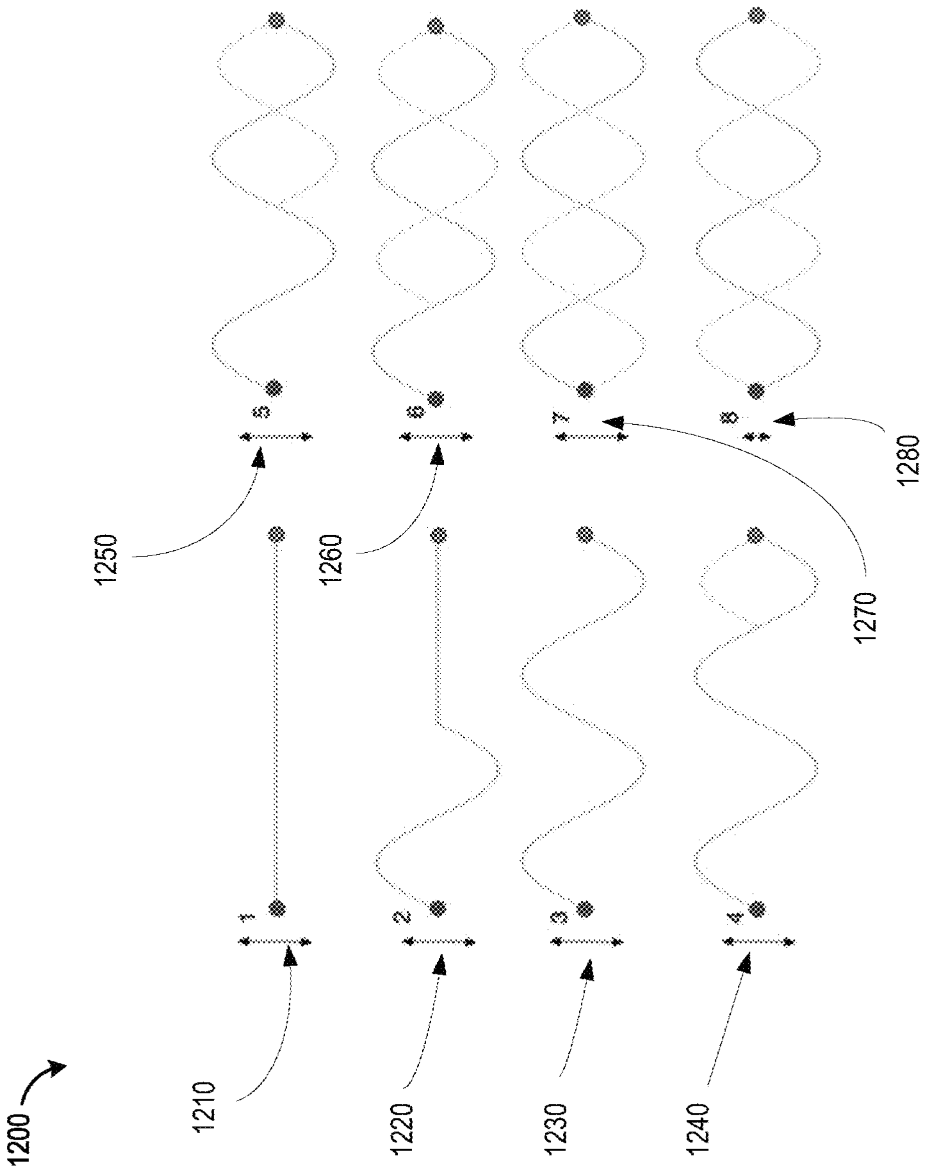
FIG. 12 shows a diagram of an example of progress in development of a standing wave.

FIG. 12 shows a diagram of an example of progress in development of a standing wave 1200 on a medium. Stage 1210 shows no energy on the medium. Stage 1220 shows 1.0 wavelength. Stage 1230 shows 2.0 wavelengths (covering the full length of the medium). Stage 1240 shows reflection off an end of the medium by 0.5 wavelengths. Stage 1250 shows reflection off the end of the medium by 1.0 wavelength. Stage 1260 shows reflection off the end of the medium by 1.5 wavelengths. Stage 1270 shows reflection off the end of the medium by 2.0 wavelengths. Stage 1280 shows the standing wave with a phase shift of IT (i.e., half of a full revolution).

Figure 13:
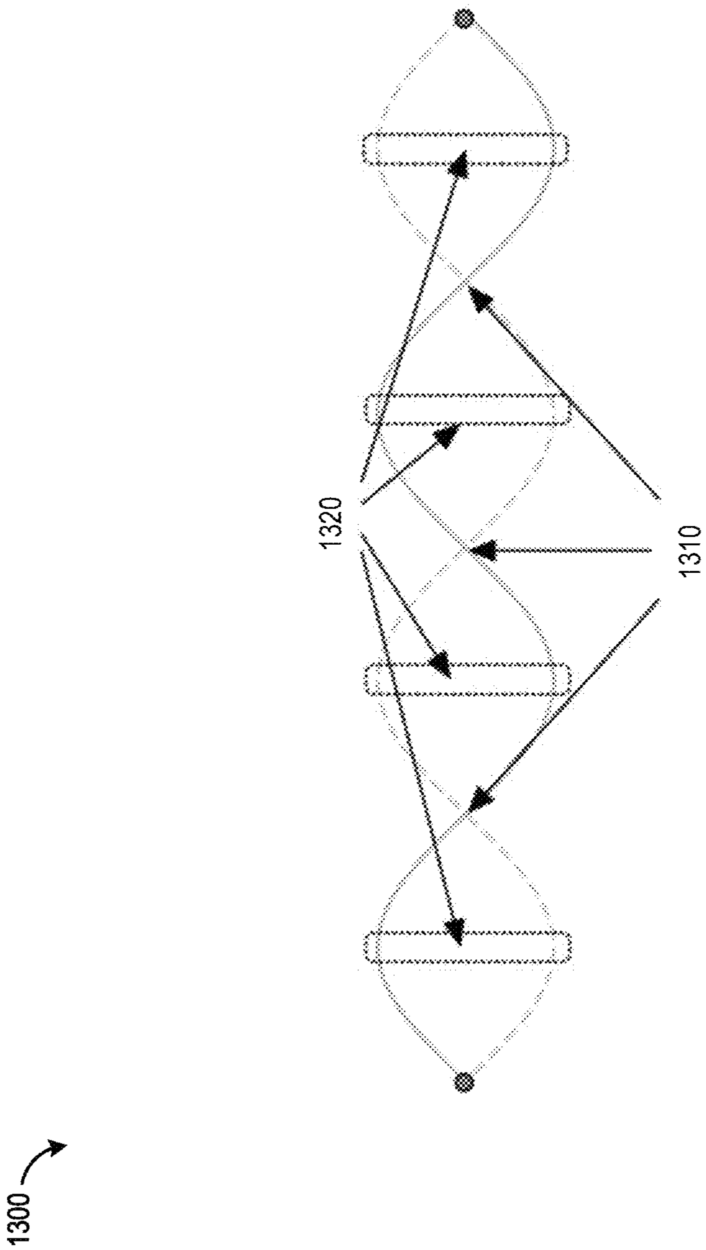
FIG. 13 shows a diagram of an example of nodes and antinodes in a standing wave.

FIG. 13 shows a diagram of an example of nodes and antinodes in a standing wave 1300 The nodes 1310 are the areas in the standing wave that are constant and do not change. The antinodes 1320 are the areas that fluctuate the most.

Applications

In at least some of the embodiments described herein, the system may be implemented in (or adapted to) one or more application scenarios, ranging from rehabilitation and physical therapy to smart home and IoT devices.

Rehabilitation and Physical Therapy: The ability to cut the medium to fit different body parts and optimize standing waves allows for personalized rehabilitation devices. Wearable leg braces or arm bands can be tailored to fit the patient's specific anatomy, providing precise haptic feedback that guides them through exercises, ensuring correct posture and movement patterns. This customization enhances the effectiveness of therapy by targeting specific muscles or joints with optimized feedback.

Virtual Reality (VR) Training: In VR training, the cuttable medium can be shaped to fit various simulation interfaces or tools used by professionals, such as surgical instruments or flight controls. Optimizing the standing wave ensures that the haptic feedback closely mimics real-world textures and resistances, making the virtual training environment more realistic and effective for professionals like surgeons or pilots.

Assistive Devices: Smart canes or wearable devices for the visually impaired can be customized using the cuttable medium to fit the user's preferences and physical requirements. By optimizing the standing wave, these devices can provide more nuanced haptic feedback, such as varying vibration patterns to indicate different obstacles, terrain changes, or directions, enhancing navigation in urban environments.

Sports Performance Enhancement: Athletic wear or equipment incorporating the system can be precisely cut and adjusted to fit the athlete's body or equipment. Optimizing the standing wave for specific sports movements allows for real-time, detailed feedback on movement efficiency, posture, or technique, aiding in performance improvement and injury prevention.

Gaming and Entertainment: Gaming controllers or wearable suits can be designed with cuttable mediums to fit various game setups or player sizes. Optimizing the standing wave within these mediums enhances the immersive experience by accurately simulating sensations like weather, terrain, or physical interactions within the game, making the virtual experiences more engaging and realistic.

Automotive and Transportation: Vehicle seats or steering wheels equipped with the system can be customized for different vehicle models or driver preferences. Optimizing the standing wave provides drivers with distinct haptic alerts for safety warnings, navigation cues, or vehicle diagnostics, improving driver awareness and safety without relying on visual or auditory distractions.

Educational Tools and Toys: Educational devices or toys incorporating the cuttable medium can be tailored to various educational activities or age groups. Optimizing the standing wave allows for a range of tactile feedback experiences, from simulating different shapes and textures to changing temperatures, engaging learners more fully in the educational content.

Medical Diagnostics Equipment: Diagnostic tools, such as probes or wearable devices, can use the cuttable medium to fit various diagnostic scenarios or patient body parts. Optimizing the standing wave enables precise haptic feedback based on the detection of specific conditions or anomalies during examinations, aiding in accurate diagnostics.

Workplace Safety Equipment: Personal protective equipment (PPE) like gloves or vests can incorporate the technology, cut to fit various sizes and workplace requirements. Optimizing the standing wave provides clear and distinct vibration patterns to alert workers to hazardous conditions or the presence of dangerous materials, enhancing safety in high-risk environments.

Smart Home and IoT Devices: Smart home devices, such as door handles or furniture, can integrate the cuttable medium to fit various device shapes or user interaction points. Optimizing the standing wave allows for customized feedback on system statuses, alerts, or interactions, making smart homes more intuitive and responsive to user actions.

Display Technologies: Integrating the dynamic haptic feedback system with display technologies across devices such as smartphones, tablets, interactive kiosks, and wearables can enhance the user experience by ensuring consistent and immersive interaction. Tailoring haptic feedback to environmental conditions and displayed content, the system may maintain optimal user engagement even as external factors like temperature and humidity change. This adaptability may enhance the relevance and impact of notifications, interactive content, and educational materials, particularly in public displays and advertising.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A haptic feedback mech system for a medium comprising:
- a sensor configured to be disposed within the medium having a size and shape;
- circuitry in communication with the sensor;
- a plurality of discrete sensing traces in communication with the circuitry, the discrete sensing traces having electrical properties that alter when the size or shape of the medium changes; and
- a processor configured to:
  - determine changes in the size or shape of the medium based on a unique pattern of the discrete sensing traces, wherein the unique pattern is defined by altered electrical properties of the discrete sensing traces generated by the changes in the size or shape of the medium; and
  - based on the determined changes, optimize a frequency of a haptic harmonic that generates a standing wave on a haptic actuator proximate to the medium.

2. The system of claim 1, wherein the medium is at least a portion of one of a piece of clothing, a textile, a seat, or a desk surface.

3. The system of claim 1, wherein the circuitry is at least one of electrical circuitry or optical circuitry.

4. The system of claim 1, wherein the processor is one of an FPGA, an ASIC, a microprocessor, or dedicated logic.

5. The system of claim 1, wherein the size is a length or a volume.

6. The system of claim 1, wherein the medium is made of a material that supports formation of the standing wave.

7. The system of claim 1, wherein the standing wave can be modulated by at least one of a half wavelength or quarter wavelength.

8. The system of claim 1, further comprising:

a plurality of cuttable regions connected to the plurality of discrete sensing traces such that each of the discrete sensing traces terminates at corresponding cuttable regions.

9. The system of claim 8, wherein the processor is further configured to:

detect the unique pattern of the discrete sensing traces based on the removal of one or more of the cuttable regions thereby altering electrical properties of the discrete sensing traces.

10. The system of claim 1, further comprising:

an environmental sensor that detects at least one of temperature, humidity, or pressure.

11. The mechanisms stem of claim 1, wherein the haptic actuator produces sound, ultrasound, or both sound and ultrasound.

12. A method for providing dynamic adjustment of haptic feedback for a medium comprising:

determining that a size or shape of the medium has changed, thereby generating detected changes, by:

based on a sensor disposed within the medium, circuitry in communication with the sensor, and a plurality of discrete sensing traces in communication with the circuitry, the discrete sensing traces having electrical properties that alter when the size or shape of the medium changes, detecting a unique pattern of the discrete sensing traces, wherein the unique pattern s defined by altered electrical properties of the discrete sensing traces generated by the changes in the size or shape of the medium; and based on the detected changes, optimizing a frequency of a haptic actuator to produce a standing wave within at least a portion of the medium.

13. The method of claim 12, wherein the optimizing the frequency comprises:

determining the frequency based at least in part on properties of the medium and how propagation of the standing wave is affected by the properties.

14. The method of claim 12, further comprising:

inputting the detected changes into an AI model that predicts optimal adjustments to the frequency for the haptic actuator.

15. The method of claim 14, wherein the optimizing the frequency is based at least in part on updated haptic feedback parameters based on the optimal adjustments predicted by the AI model.

16. The method of claim 14, wherein the AI model predicts the optimal adjustments to at least one of the frequency, an amplitude, and a waveform.

17. The method of claim 12, wherein the optimizing the frequency is based on haptic feedback parameters extracted from a look-up table associated with size detection.

18. The method of claim 12, further comprising:

determining that an environmental factor has changed, the environmental factors comprising at least one of temperature, humidity, or pressure; and wherein the optimizing the frequency of the haptic actuator is also based on a change in the environmental factor.

19. The method of claim 12, wherein the haptic actuator produces sound, ultrasound, or both sound and ultrasound.

20. The method of claim 14, further comprising:

updating the AI model at least in part by adjusting internal parameters or algorithms based on data obtained related to at least one of a user's response or effectiveness of the predicted optimal adjustments.

* * * * *